United States Patent
Iwai

(10) Patent No.: US 8,210,219 B2
(45) Date of Patent: Jul. 3, 2012

(54) PNEUMATIC TIRE WITH TREAD HAVING CROWN RIB AND MIDDLE RIBS

(75) Inventor: Yoshitaka Iwai, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 199 days.

(21) Appl. No.: 12/815,454

(22) Filed: Jun. 15, 2010

(65) Prior Publication Data
US 2011/0024012 A1 Feb. 3, 2011

(30) Foreign Application Priority Data
Aug. 3, 2009 (JP) ................. 2009-180896

(51) Int. Cl.
*B60C 11/04* (2006.01)
*B60C 11/12* (2006.01)
(52) U.S. Cl. ............. 152/209.27; 152/209.28; 152/901; 152/DIG. 3
(58) Field of Classification Search ............ 152/209.27, 152/209.28, DIG. 3, 901
See application file for complete search history.

(56) References Cited

U.S. PATENT DOCUMENTS

| | | | | |
|---|---|---|---|---|
| 5,753,058 | A * | 5/1998 | Fukumoto et al. | 152/901 |
| 6,095,216 | A * | 8/2000 | Cenni et al. | 152/209.28 |
| 6,450,223 | B1 * | 9/2002 | Landers et al. | 152/209.28 |
| 2005/0076985 | A1 * | 4/2005 | Colombo et al. | 152/209.18 |
| 2005/0211355 | A1 * | 9/2005 | Metz | 152/209.24 |
| 2006/0130950 | A1 * | 6/2006 | Murata | 152/209.24 |

FOREIGN PATENT DOCUMENTS

| | | | |
|---|---|---|---|
| CZ | 279542 B6 | * | 5/1995 |
| DE | 29824833 U1 | | 9/2003 |
| JP | 64-036505 A | * | 2/1989 |
| JP | 05-162512 A | * | 6/1993 |
| JP | 7-172110 A | | 7/1995 |
| JP | 1070606 A2 | | 1/2001 |
| JP | 2001-219718 A | | 8/2001 |
| JP | 2009-101850 A | | 5/2009 |
| JP | 2070730 A1 | | 6/2009 |
| JP | 2009-149124 A | | 7/2009 |
| WO | WO-2007/028442 A1 | * | 3/2007 |

OTHER PUBLICATIONS

Machine translation for Japan 05-162512 (no date).*
Machine translation for WO 2007/028442 (no date).*

* cited by examiner

*Primary Examiner* — Steven D Maki
(74) *Attorney, Agent, or Firm* — Birch, Stewart, Kolasch & Birch, LLP

(57) ABSTRACT

A pneumatic tire comprises circumferentially-continuously-extending crown main grooves and shoulder main grooves to divide the tread portion into one crown rib, two middle ribs and two shoulder ribs. The middle rib is provided with a circumferentially-continuously-extending middle sub groove to define an axially inner part and an axially outer part. The axially inner part is provided with inner middle lug grooves comprising an axially outer wide main part and an axially inner narrow part. The axially outer part is provided with outer middle lug grooves comprising an axially outer main part an axially inner sipe-like narrow part. The width and position of the middle sub groove, and the widths of the lug grooves are specifically defined in order to improve the wet performance and noise performance in a well balanced manner while maintaining the steering stability.

20 Claims, 5 Drawing Sheets

PNEUMATIC TIRE WITH TREAD HAVING CROWN RIB AND MIDDLE RIBS

BACKGROUND OF THE INVENTION

The present invention relates to a pneumatic tire, more particularly to a tread pattern capable of improving the wet performance and noise performance in a well balanced manner while maintaining the steering stability.

Heretofore, it has been known to be effective for improving the steering stability on dry roads to increase the rigidity of the land portions (or ground contacting tread elements) by increasing the land ratio of the tread portion (proportion of the total area of the land portions to the overall tread area) as far as possible.

In the case of pneumatic tires designed for large-sized passenger cars having heavy weight, since the ground pressure of the tread portion becomes large, it is especially effective to increase the land ratio by decreasing the total volume of tread grooves.

In recent years, on the other hand, on the outside and inside of the passenger cars, quietness is sought, therefore, a tire is also required to reduce its noise during running. For example, the so called air resonance sound and air pumping sound which occur in tread grooves in the ground contacting patch and become main causes for the pass-by noise, can be reduced by decreasing the volume of the tread grooves.

However, if the volume of the tread groove is decreased, wet performance of the tire is liable to deteriorate. Particularly, if the groove volume is decreased in the tread central region, hydroplaning phenomenon is more likely to occur.

SUMMARY OF THE INVENTION

It is therefore, an object of the present invention to provide a pneumatic tire suitable for passenger cars having a relatively heavy weight, in which the tread portion is provided with a tread pattern based on a five-rib pattern which is modified by providing relatively narrow grooves and sipes, and the steering stability, wet performance and noise performance can be improved in a well balanced manner.

According to the present invention, a pneumatic tire (1) comprises a tread portion (2) provided with:
a circumferentially-continuously-extending crown main groove (3) disposed on each side of the tire equator (C); and
a circumferentially-continuously-extending shoulder main groove (4) disposed on each side of the tire equator (C) and on the axially outside of said circumferentially-continuously-extending crown main groove (3), so that the tread portion (2) is axially divided into five ribs (8, 9 and 12) including:
one crown rib (8) between the crown main grooves (3);
two middle ribs (9) between the crown main grooves (3) and shoulder main grooves (4); and
two shoulder ribs (12) between the shoulder main grooves (4) and tread edges (Te),
wherein
each of the middle ribs (9) is provided with a circumferentially-continuously-extending middle sub groove (5) having a width (W3) of from 1.5 to 3.0 mm and having a groove center line positioned between 20% and 45% of the axial width (W6) of the middle rib (9) from the axially inner edge (9i) of the middle rib (9), so as to define an axially inner part (10) and an axially outer part (11) of the middle rib (9) which are positioned on the axially inside and outside of the middle sub groove (5), respectively, the middle-rib's axially inner part (10) is provided with a plurality of inner middle lug grooves (15) which are arranged circumferentially of the tire at intervals and which extend from the middle sub groove (5) toward the tire equator (C) side and terminate without reaching to the crown main groove (3), each of said plurality of inner middle lug grooves (15) comprises a main part (15a) having a groove width of not less than 1.5 mm and formed on the middle sub groove (5) side, and a sipe-like narrow part (15b) having a groove width of less than 1.5 mm and formed on the tire equator (C) side of the main part (15a), the middle-rib's axially outer part (11) is provided with a plurality of outer middle lug grooves (16) which are arranged circumferentially of the tire at intervals and which extend from the shoulder main groove (4) towards the tire equator (C) side and terminate without being connected to the middle sub groove (5), and each of said plurality of outer middle lug grooves (16) comprises a main part (16a) having a groove width of not less than 2.0 mm and formed on the shoulder main groove (4) side, and a sipe-like narrow part (16b) having a groove width of less than 2.0 mm and formed on the tire equator (C) side of the main part (16a).

In this application including the description and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflate to the standard pressure and loaded with the standard tire load. The standard wheel rim is a wheel rim officially approved for the tire by standard organization, i.e. JATMA (Japan and Asia), T&RA (North America), ETRTO (Europe), STRO (Scandinavia) and the like. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like.

In case of passenger car tires, however, the standard pressure and standard tire load are uniformly defined by 180 kPa and 88% of the maximum tire load, respectively.

The undermentioned tread width TW is the axial distance between the tread edges Te measured in the normally inflated unloaded condition of the tire.

The tread edges Te are the axial outermost edges of the ground contacting patch (camber angle=0) in the normally inflated loaded condition.

DESCRIPTION OF THE PREFERRED EMBODIMENTS

Embodiments of the present invention will now be described in detail in conjunction with the accompanying drawings.

The pneumatic tire 1 according to the present invention comprises: a tread portion 2 having an radially outer surface defining a tread surface and tread edges; a pair of axially spaced bead portions each with a bead core therein; a pair of sidewall portions extending between the tread edges and the bead portions; a carcass extending between the bead portions through the tread portion and sidewall portions; and a tread reinforcing belt disposed radially outside the carcass in the tread portion, as well known in the art.

In this embodiment, the pneumatic tire 1 is a radial tire designed for passenger cars having relatively heavy weight such as so called full size standard car, premium car and luxury car.

Further, the tread portion 2 is provided with tread grooves defining a unidirectional tread pattern having an intended tire rotational direction R. In other words, the tire is designed to roll in only one direction. The rotational direction R is indicated in the sidewall portions by the use of letters, mark and the like.

Figure 1:
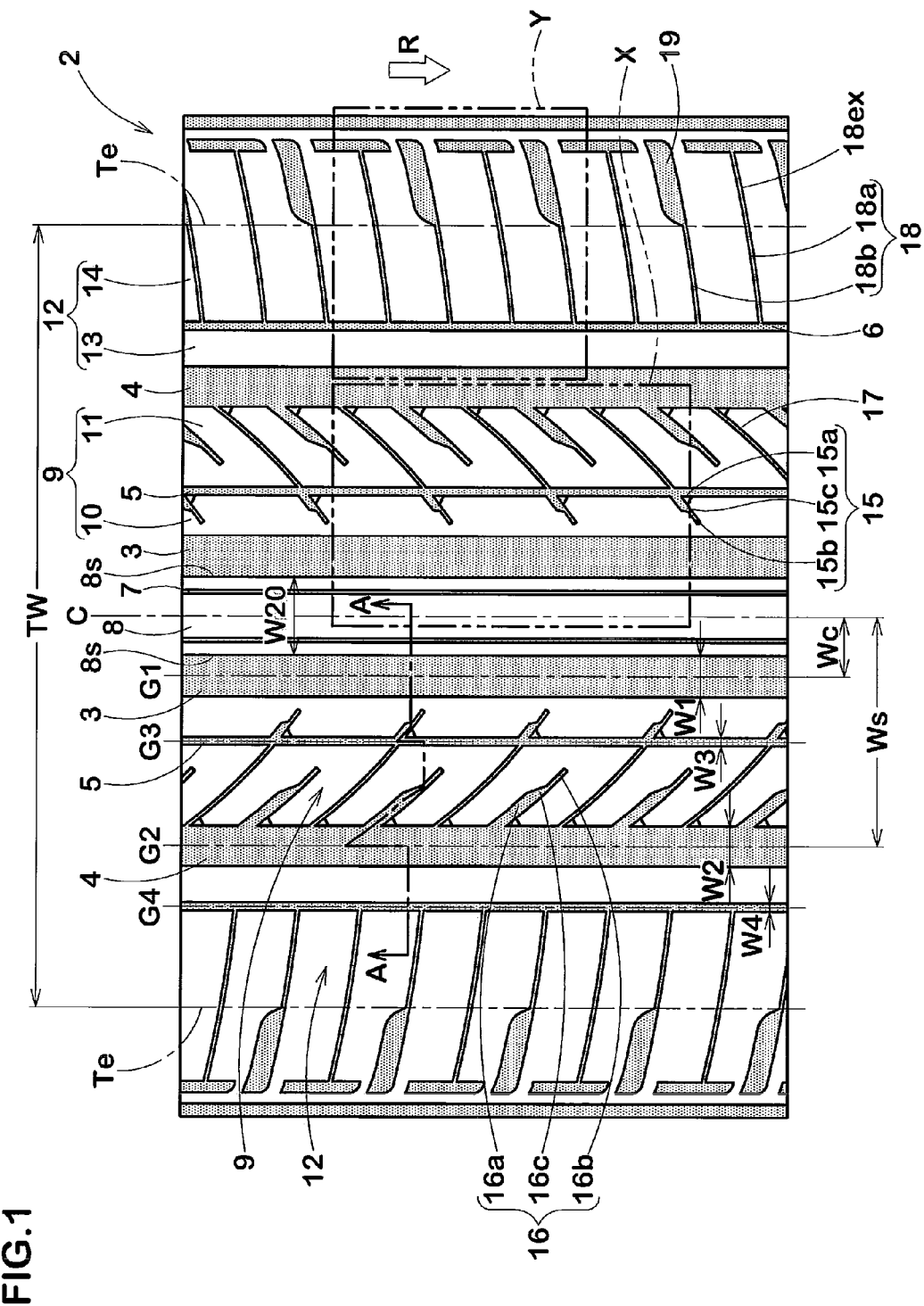
FIG. 1 is a developed partial plan view of a pneumatic tire according to the present invention showing a tread pattern.

As shown in FIG. 1, the tread portion 2 is provided with four circumferentially-continuously-extending main grooves 3 and 4: a pair of crown main grooves 3 disposed one on each side of the tire equator C, and a pair of shoulder main grooves 4 disposed one on the axially outside of each of the crown main grooves 3.

The tread portion 2 is therefore, divided into five ribs (or annular parts) 8, 9 and 12: a crown rib 8 between the two crown main grooves 3, a pair of middle ribs 9 between the crown main grooves 3 and the shoulder main grooves 4, and a pair of shoulder ribs 12 between the shoulder main grooves 4 and tread edges Te.

Figure 2:
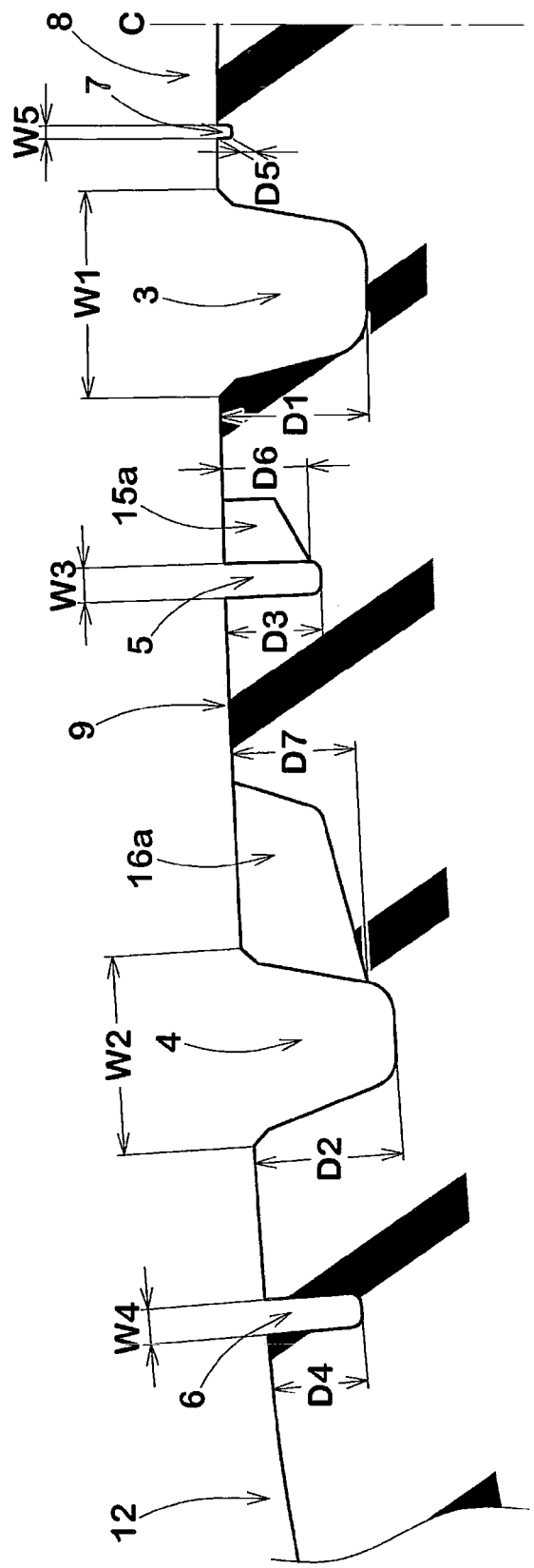
FIG. 2 is a partial cross sectional view of the tread portion of the tire taken along line A-A in FIG. 1.

In order to provide necessary rigidity for the ribs 8, 9 and 12 while maintaining necessary drainage, as shown in FIG. 2, the axial width W1 of the crown main grooves 3 at the groove top is preferably set in a range of from 4.0 to 7.0% of the tread width TW, and the axial width W2 of the shoulder main grooves 4 at the groove top is preferably set in a range of from 4.0 to 8.0% of the tread width TW.

In the case of passenger tires, it is preferable that the groove depth D1 of the crown main grooves 3 and the groove depth D2 of the shoulder main grooves 4 are set in a range of from 7.0 to 9.0 mm. In this embodiment, the groove depth D1 is the same as the groove depth D2.

The crown main grooves 3 and shoulder main grooves 4 in this embodiment are straight, and their cross-sectional shapes are constant along the tire circumferential direction. Such main grooves 3 and 4 bring out good drainage and make it possible to control instability behaviors of the vehicle such as wandering and one-side drifting during braking operation, therefore, such configuration is desirable in view of the steering stability. But, it is also possible to form the main grooves 3 and 4 in wavy or zigzag configurations.

In order to optimize the distribution of rigidity of the ribs 8, 9 and 12 in the tire axial direction, and thereby to improve the steering stability, it is preferable that the axial distance Wc from the tire equator C to the widthwise center line G1 of each of the crown main grooves 3 is set in a range of not less than 4.5%, more preferably not less than 6%, but not more than 13%, more preferably not more than 10% of the tread width TW, and the axial distance Ws from the tire equator C to the widthwise center line G2 of each of the shoulder main grooves 4 is set in a range of not less than 25%, more preferably not less than 28%, but not more than 35%, more preferably not more than 32% the tread width TW.

Figure 3:
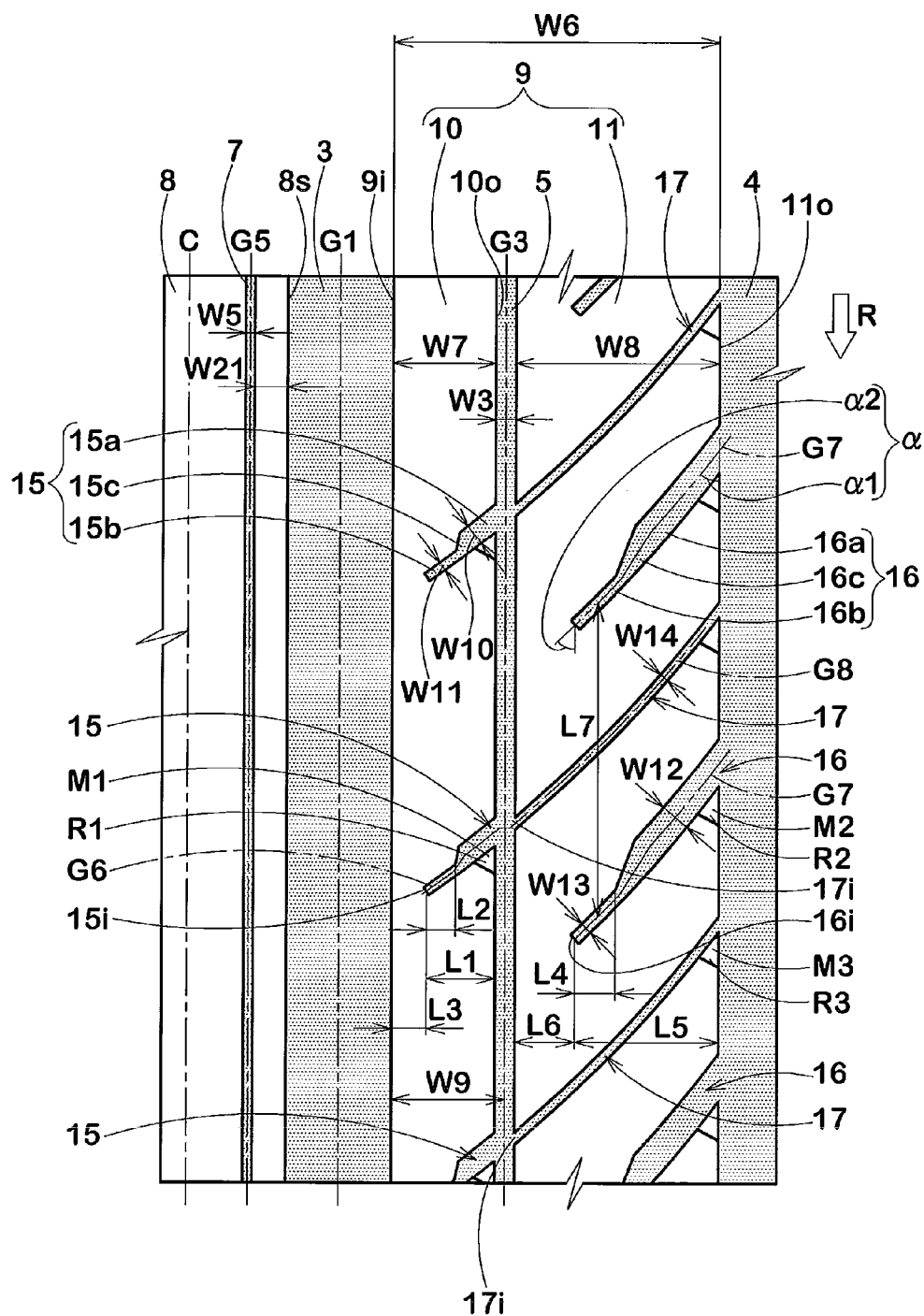
FIG. 3 is an enlarged view of a part x of FIG. 1.

The above-mentioned middle ribs 9 are each provided with a single middle sub groove 5 as shown in FIG. 3.

The middle sub groove 5 is a straight groove extending continuously in the tire circumferential direction.

The middle sub groove 5 is narrower in width than the main grooves 3 and 4. The groove width W3 of the middle sub groove 5 is set to be not more than 3 mm to secure a necessary rigidity for the middle rib 9 and good steering stability, but set to be not less than 1.5 mm in view of wet performance.

Further, the middle sub groove 5 is shallower in depth than the main grooves 3 and 4, and has a groove depth D3 in a range of not less than 40%, preferably not less than 50%, more preferably not less than 55%, but not more than 80%, preferably not more than 75%, more preferably not more than 70% of the groove depth D1 of the crown main grooves 3. The widthwise center line G3 of the middle sub groove 5 is positioned at an axial distance W9 from the axially inner edge 9i of the middle rib 9, and the axial distance W9 is in a range of not less than 20%, preferably not less than 28%, but not more than 45%, preferably not more than 35% of the width W6 of the middle rib 9.

Since the middle sub groove 5 is narrow and shallow, the middle rib 9 is partitioned into an axially inner part 10 and an axially outer part 11, retaining a some degree of unity for a rib. Thus, the middle sub groove 5 can remove the water existing between the middle rib 9 and road surface, without deteriorating the rigidity of the middle rib 9.

As shown in FIG. 1 and FIG. 3, the middle-rib's axially inner part 10 is provided with a plurality of axially inner middle lug grooves 15 arranged circumferentially of the tire at intervals in the tire circumferential direction.

The axially inner middle lug grooves 15 extend from the above-mentioned middle sub groove 5 towards the tire equator side, namely, axially inside, and terminate within the axially inner part 10, without being connected to the crown main grooves 3.

As shown in FIG. 1 and FIG. 3, the axially inner middle lug groove 15 is inclined to the rotational direction R towards the tire equator or towards the axially inside.

The axially inner middle lug groove 15 in this embodiment comprises:

a main part 15a having the axially outer end opened to the middle sub groove 5, and having a constant groove width W10 of not less than 1.5 mm;

a sipe-like narrow part 15b positioned on the tire equator side of the main part 15a, and having a constant groove width W11 of less than 1.5 mm; and an optional connecting part 15c connecting the main part 15a and sipe-like narrow part 15b, wherein the groove width of the connecting part 15c gradually decreases from that of the main part 15a to that of sipe-like narrow part 15b.

But, it is also possible to connect the main part 15a directly to the sipe-like narrow part 15b with a stepped difference in the groove width.

The middle-rib's axially outer part 11 is provided with a plurality of axially outer middle lug grooves 16 arranged circumferentially of the tire at intervals in the tire circumferential direction.

The axially outer middle lug grooves 16 extend from the shoulder main groove 4 towards the tire equator side, namely, axially inside, and terminate within the axially outer part 11, without being connected to the middle sub groove 5.

Therefore, in each of the axially inner part 10 and axially outer part 11, the lug grooves 15/16 can improve drainage in the axially outer portion thereof, while maintaining the rigidity in the axially inner portion where the ground pressure is relatively high.

The water existing between the middle rib 9 and road surface is led to the middle sub groove 5 and shoulder main groove 4 by the axially inner and outer middle lug grooves 15 and 16, therefore, wet performance, especially drainage during high speed running can be improved.

Since the inner and outer middle lug grooves 15 and 16 are not connected to the crown main grooves 3 and middle sub groove 5, propagation of noise sound from a circumferentially extending groove to groove, especially, from the groove 3 to groove 4, can be prevented.

Further, the axially outer middle lug grooves 16 can reduce air resonance sound occurring in the wide shoulder main groove 4 since the middle lug grooves 16 are opened to the shoulder main groove 4 and thereby the occurrence of a standing wave is hindered.

As shown in FIG. 1 and FIG. 3, the axially outer middle lug groove 16 is inclined to the rotational direction R towards the tire equator or towards the axially inside at a non-zero angle α with respect to the tire circumferential direction. The angle α is set in a range of not less than 25 degrees, preferably not less than 30 degrees, more preferably not less than 34 degrees, but not more than 57 degrees, preferably not more than 53 degrees, more preferably not more than 50 degrees. Therefore, the axially outer middle lug grooves 16 can suppress the decrease in rigidity of the middle-rib's axially outer part 11. For that purpose, it is especially preferable for the axially outer middle lug groove 16 that the inclination angle α2 at the groove end on the tire equator C side is more than the inclination angle α1 at the groove end on the shoulder main grooves 4 side.

The angle difference (α2-α1) is not less than 5 degrees, more preferably not less than 10 degrees, but not more than 18 degrees, more preferably not more than 14 degrees.

Thereby, the rigidity distribution of the middle-rib's axially outer part 11 is improved, and the drainage from the axially outer middle lug grooves 16 to the shoulder main groove 4 is increased.

The axially outer middle lug groove 16 in this embodiment comprises:
a main part 16a having a constant groove width W12 of not less than 2.0 mm and having the axially outer end opened to the shoulder main grooves 4;
a sipe-like narrow part 16b having a constant groove width W13 of less than 2.0 mm and positioned the tire equator side of the main part 16a; and
an optional connecting part 16c connecting the main part 16a and sipe-like narrow part 1bb, wherein the groove width the connecting part 16c gradually decreases from that of the main part 16a to that of the sipe-like narrow part 16b.

Therefore, the drainage from the middle rib 9 zone can be improved by the wide main parts 15a and 16a in cooperation with sipe-like narrow parts 15b and 16b, while minimizing the decrease in the rigidity of the axially inner part 10 and outer part 11 owing to the sipe-like narrow parts 15b and 16b.

In view of the drainage, it is preferable that the groove width W10 of the main part 15a of the axially inner middle lug groove 15 is not less than 1.7 mm. However, if the groove width W10 is too wide, the rigidity of the middle-rib's axially inner part 10 decreases, and the steering stability tends to deteriorate. Therefore, the groove width W10 is preferably not more than 2.5 mm, more preferably not more than 2.3 mm.

In view of the steering stability, it is preferable that the groove width W11 of the sipe-like narrow part 15b is not more than 1.0 mm, more preferably not more than 0.8 mm. In order that the sipe-like narrow part can be form by a blade protruding from the inner surface of the tire vulcanizing mold, the groove width W11 corresponding to the thickness of such blade should be at least 0.3 mm, preferably not less than 0.5 mm. For similar reasons, the groove width W13 of the sipe-like narrow part 16b is at least 0.4 mm, preferably not less than 0.6 mm, but not more than 1.2 mm, more preferably not more than 1.0 mm. The groove width W12 of the main part 16a is preferably not less than 2.2 mm, but not more than 3.2 mm, more preferably not more than 3.0 mm.

If the axial length L2 of the sipe-like narrow part 15b and the axial length L4 of the sipe-like narrow part 16b become relatively long, since the axially inner middle lug groove 15 and outer middle lug groove 16 are decreased in the groove volume, and the drainage tends to become insufficient. If the lengths L2 and L4 become relatively short, the middle rib's axially inner part 10 and outer part 11 become insufficient in the rigidity as a rib. Further, the effect of blocking the noise sounds decreases.

Therefore, the axial length L2 of the sipe-like narrow part 15b is preferably not less than 35%, more preferably not less than 40%, but not more than 55%, more preferably not more than 50% of the axial length L1 of the axially inner middle lug groove 15. The axial length L4 of the sipe-like narrow part 16b is preferably not less than 18%, more preferably not less than 23%, but not more than 38%, more preferably not more than 33% of the axial length L5 of the axially outer middle lug groove 16.

If the axial distance L3 of the axially inner end 15i of the sipe-like narrow part 15b from the crown main groove 3 (shown in FIG. 3) becomes increased, the drainage decreases. If the axial distance L3 becomes too short, since the rigidity is greatly decreased in the land part between the axially inner end 15i and the crown main groove 3, uneven wear is liable to occur in this part.

Therefore, the axial distance L3 is preferably not less than 15%, more preferably not less than 20%, but not more than 45%, more preferably not more than 30% of the width W7 of the middle-rib's axially inner part 10.

For the similar reasons, the axial distance L6 of the axially inner end 16i of the sipe-like narrow part 16b from the middle sub groove 5 is preferably not less than 15%, more preferably not less than 20%, but not more than 45%, more preferably not more than 35% of the width W8 of the middle-rib's axially outer part 11.

The groove depth D6 of the main part 15a of the axially inner middle lug groove 15 is preferably set in a range of not less than 55%, more preferably not less than 60%, but not more than 95%, more preferably not more than 90% of the groove depth D3 of the middle sub groove 5.

If the groove depth D6 is more than 95%, the rigidity of the axially inner part 10 is decreased and the steering stability deteriorates. If the groove depth D6 is less than 55%, the drainage becomes insufficient.

Preferably, the groove depth D6 is gradually increased from the axially inner end to the axially outer end of the main part 15a within the above-mentioned range in order to improve the drainage towards the middle sub groove 5.

For the similar reasons, the groove depth D7 of the main part 16a of the axially outer middle lug groove 16 is preferably set in a range of not less than 60%, more preferably not less than 65%, but not more than 92%, more preferably not more than 87% of the groove depth D2 of the shoulder main grooves 4.

Preferably, the groove depth D7 of the main part 16a is gradually increased from the axially inner end to the axially outer end of the main part 16a within the above-mentioned range in order to improve the drainage towards the shoulder main groove 4.

Preferably, the circumferential pitch number of the inner middle lug grooves 15 and that of the outer middle lug grooves 16 are set in a range of from 120 to 160. Incidentally, the pitch number corresponds to the number of the grooves 15/16 per a rib 9.

Further, the middle-rib's axially outer part 11 is, as shown in FIG. 3, provided between every two of the circumferentially-adjacent outer middle lug grooves 16 with a middle sipe 17 extending from the shoulder main groove 4 to the middle sub groove 5.

The middle sipe 17 in this embodiment is inclined to the substantially same direction as the axially outer middle lug groove 16, namely, inclined to the rotational direction R towards the tire equator C side (towards the axially inside). The groove width W14 of the middle sipe 17 is set in a range of not less than 0.5 mm, preferably not less than 0.7 mm, but not more than 1.5 mm, preferably not more than 1.3 mm.

The middle sipe 17 is disposed substantially midway between the circumferentially adjacent outer middle lug grooves 16. In other words, at any axial position on the widthwise center line G8 of the middle sipe 17, the center line G8 is positioned within a range between 47% and 53% of a circumferential distance L7 between the center lines G7 of the circumferentially adjacent outer middle lug grooves 16.

Therefore, the middle sipes 17 can improve wet performance, without substantially decreasing the rigidity of the axially outer part 11 as a rib, In order to further improve the drainage, as shown in FIG. 1 and FIG. 3, the axially inner end 17i of each of the middle sipes 17 is oppositely opposed to the axially outer end of one of the axially inner middle lug grooves 15 with the middle sub groove 5 interposed therebetween. More specifically, an extended line of the center line G8 of the middle sipe 17 falls within the width of the opening of the axially outer end of the axially inner middle lug groove 15.

Since the lug grooves 15 and 16 and middle sipes 17 are inclined towards the rotational direction R, as the vehicle travels forward, the lug grooves 15 and 16 and middle sipes 17 come into contact with the ground from their axially inner parts to axially outer parts, as a result, the water existing between the tread and the ground is led towards the tread edge sides and ejected.

As shown in FIG. 1 and FIG. 3, acute-angled corners R1 formed between the axially inner middle lug grooves 15 and the middle sub groove 5 are chamfered so that each of the chamfered part M1 has a substantially triangular shape in the plan view thereof. Acute angled corners R2 formed between the axially outer middle lug grooves 16 and the shoulder main groove 4, are chamfered so that each of the chamfered part M2 has a substantially triangular shape in the plan view thereof. Acute angled corners R3 formed between the middle sipes 17 and the shoulder main groove 4 are chamfered so that each of the chamfered part M3 has a substantially triangular shape in the plan view thereof. The chamfered surface of each of the chamfered parts M1, M2 and M3 having the substantially triangular shape can be a flat surface or a curved surface. Therefore, uneven wear starting from the acute angled corners and chipping-off of the tread rubber can be prevented.

Figure 4:
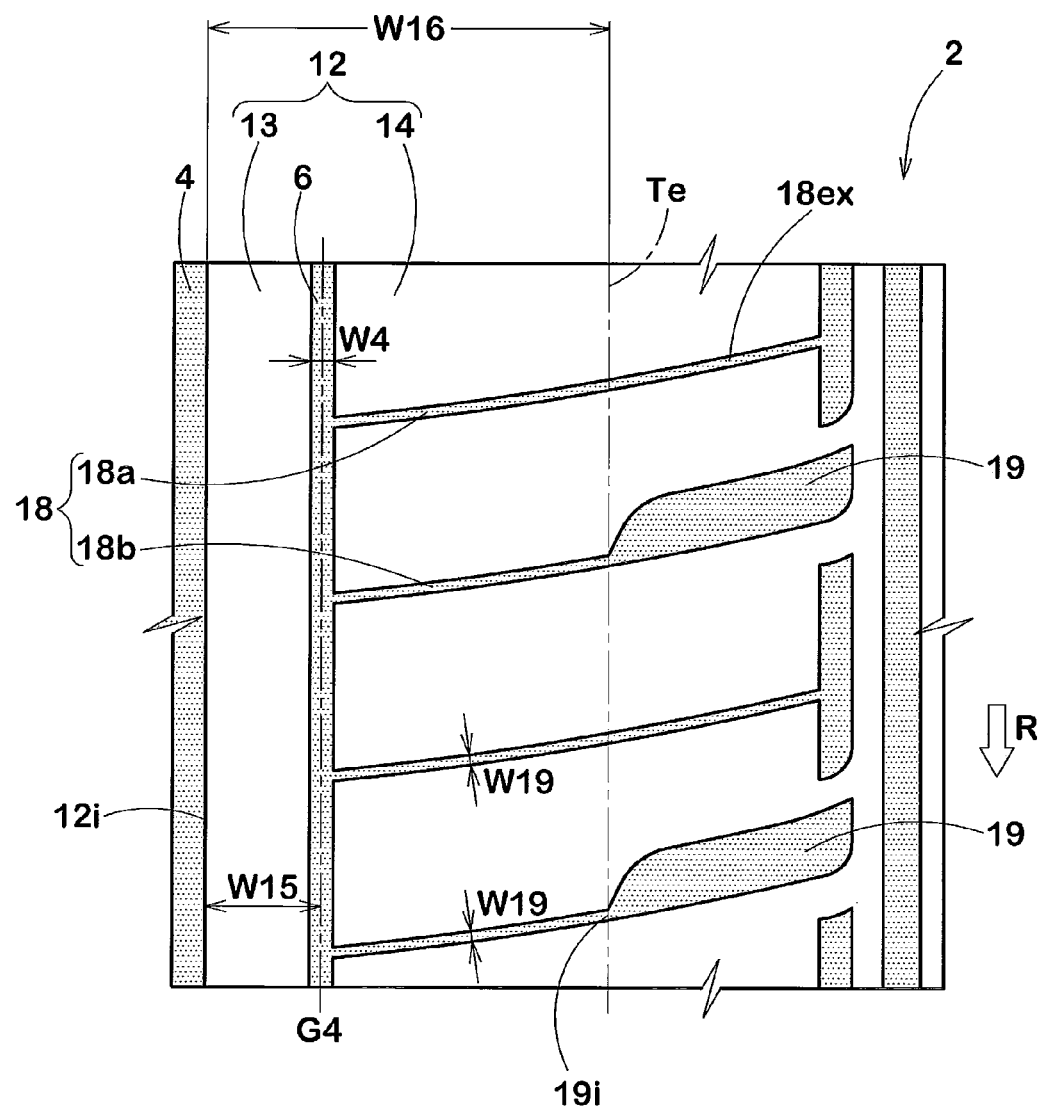
FIG. 4 is an enlarged view of a part Y of FIG. 1.
Figure 5:
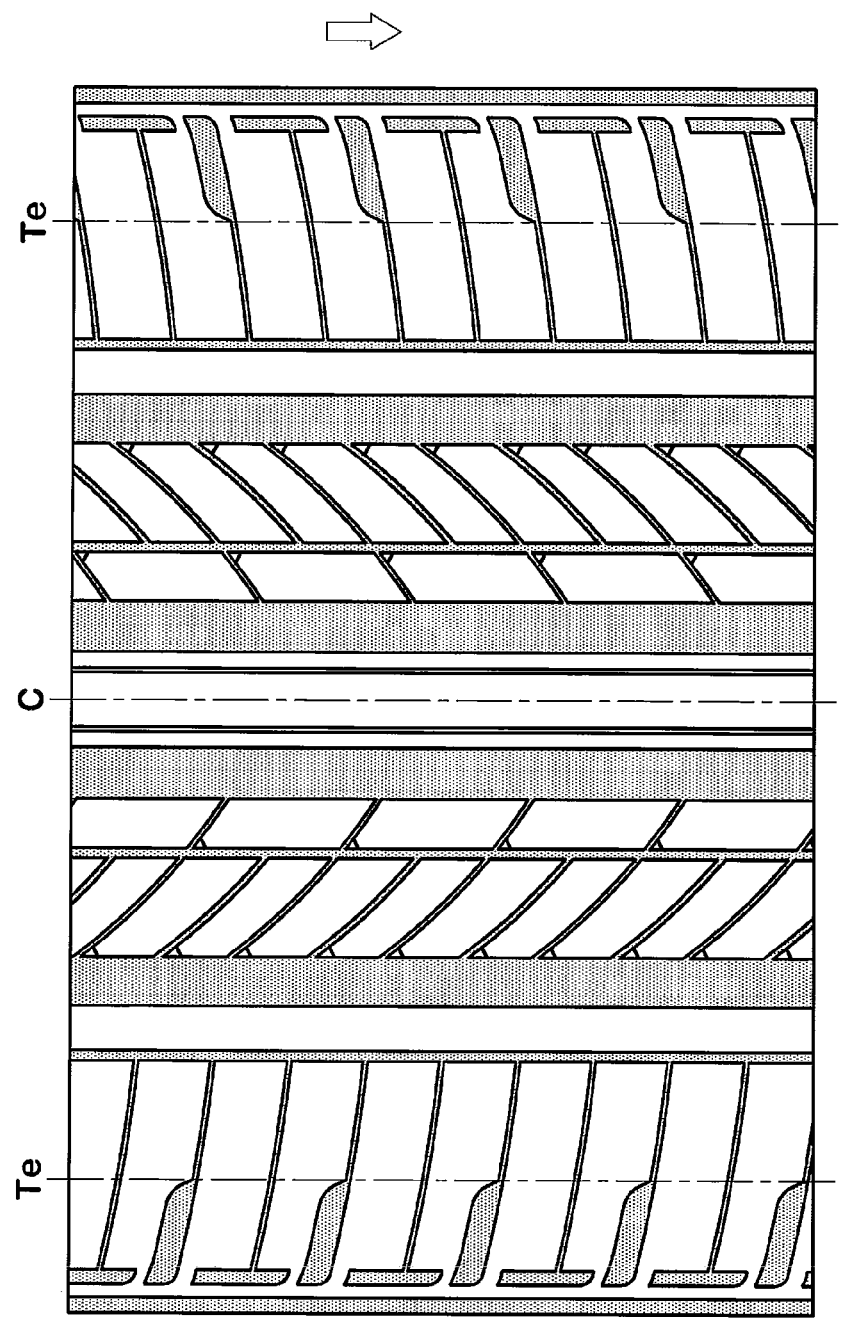
FIG. 5 is a developed partial plan view of the ref.1 tire used in the undermentioned comparative tests.

As shown in FIG. 4, each of the shoulder ribs 12 is provided with a single shoulder sub groove 6.

The shoulder sub groove 6 is a straight groove extending continuously in the tire circumferential direction.

The groove width W4 of the shoulder sub groove 6 is preferably set in a range of not less than 1.5 mm, more preferably not less than 1.8 mm, but not more than 3.2 mm, more preferably not more than 3.5 mm.

The groove depth D4 of the shoulder sub groove 6 is preferably set in a range of not less than 50%, more preferably not less than 55%, but not more than 70%, more preferably not more than 65% of the groove depth D1 of the crown main groove 3.

The shoulder rib 12 is therefore, partitioned into an axially inside portion 13 between the shoulder sub groove 6 and the shoulder main groove 4, and an axially outside portion 14 positioned axially outside the shoulder sub groove 6.

In order to provide a good rigidity balance between the shoulder-rib's axially inside portion 13 and outside portion 14, the widthwise center line G4 of the shoulder sub groove 6 is positioned at a distance W15 from the axially inner edge 12i of the shoulder rib 12, which distance W15 is set in a range of not less than 18%, preferably not less than 22%, but not more than 34%, preferably not more than 30% of the width W16 of the shoulder rib 12.

Therefore, the steering stability and the drainage from the shoulder rib 12 zone can be improved.

If the distance W15 is less than 18% of the width W16, the lateral stiffness (rigidity) of the shoulder-rib's axially inside portion 13 is decreased, and uneven wear so called rib punch wear tends to occur. If more than 35%, the steering stability is deteriorated, and it becomes difficult to improve the wet performance.

If the groove width W4 of the shoulder sub groove 6 is more than 3.2 mm, it becomes difficult to provide a necessary rigidity for the shoulder rib 12, therefore, the steering stability is liable to deteriorate. If less than 1.5 mm, it becomes difficult to improve the wet performance.

The shoulder-rib's axially inside portion 13 is formed as a plain straight rib not provided with a type of void, e.g. groove, sipe, incision and the like.

In such inside portion 13, the rigidity distribution is even in the tire circumferential direction and axial direction, therefore, this portion 13 has a high resistance to uneven wear, and can improve the steering stability.

On the other hand, the shoulder-rib's axially outside portion 14 is provided with a plurality of shoulder sipes 18 arranged circumferentially of the tire at intervals in the tire circumferential direction.

The shoulder sipes 18 each extend axially outwardly from the shoulder sub groove 6 to the tread edge Te at an angle, which angle is set in a range of not more than 10 degrees with respect to the tire axial direction in order that the shoulder rib 12 keeps its high lateral stiffness (rigidity).

In this example, the shoulder sipes 18 are slightly inclined towards the rotational direction R in the same way as the middle lug grooves 15 and 16 and middle sipes 17 are inclined.

The groove width W19 of the shoulder sipe 18 is preferably set in a range of not less than 0.5 mm, more preferably not less than 0.7 mm, but not more than 1.5 mm, more preferably not more than 1.3 mm.

If the groove width W19 is more than 1.3 mm, it becomes difficult to provide a necessary rigidity for the shoulder-rib's axially outside portion 14, and difficult to suppress the noise sound.

As described above, the inner and outer middle lug grooves 15 and 16, middle sipes 17, and shoulder sipes 18 are inclined towards the rotational direction R (namely, one circumferential direction). Further, as shown in FIGS. 1, 3 and 4, of the edges of the grooves 15 and 16 and sipes 17 and 18, at least the leading edges in the rotational direction R are smoothly curved such that the angles between such edges and the tire circumferential direction gradually increase towards the tire equator side or axially inside.

This helps to increase the lateral stiffness (rigidity) of the ribs 9 and 12 toward the tire equator C, and thereby the running stability during straight running can be improves to lessen the wandering of heavy passenger cars.

The above-mentioned crown rib 8 in this embodiment is, as shown in FIG. 1 and FIG. 3, provided with a pair of crown sub grooves 7 extending straight in the tire circumferential direction.

The crown sub grooves 7 each have a groove center line G5 positioned at an axial distance W21 from the side edge 8s of the crown rib 8, and the distance W21 is set in a range of not less than 6%, preferably not less than 11%, but not more than 21%, preferably not more than 16% of the width W20 of the crown rib 8.

The groove width W5 of the crown sub groove 7 is preferably not less than 0.5 mm, but preferably not more than 1.0 mm.

The groove depth D5 of the crown sub groove 7 is preferably not less than 5%, more preferably not less than 8%, but not more than 18%, more preferably not more than 15% of the groove depth D1 of the crown main grooves 3.

Therefore, the crown sub grooves 7 can improve the wet performance, e.g. resistance to aquaplaning, without substantially decreasing the rigidity of the crown rib 8. Thus, the running stability during straight running is further improved.

Further, in order to provided a road grip and drainage during cornering, on the axially outside of each tread edge Te, a plurality of shoulder lug grooves 19 are provided.

The shoulder lug grooves 19 are arranged circumferentially of the tire at intervals in the tire circumferential direction. The above-mentioned shoulder sipes 18 include: shoulder sipes 18b to which the shoulder lug groove 19 are connected; and shoulder sipes 18a to which the shoulder lug groove 19 are not connected.

The axially inner ends 19i of the shoulder lug grooves 19 are connected to the shoulder sipes 18b in the vicinity of the tread edge Te.

The shoulder sipes 18a each have an extended portion 18ex having the same width as the main portion and extending for the almost same length as the shoulder lug grooves 19.

The circumferential pitch lengths of the shoulder lug grooves 19 are 2 times the circumferential pitch lengths of the shoulder sipes 18. Therefore, the shoulder sipes 18a and shoulder sipes 18b alternate in the tire circumferential direction.

Comparison Tests

Test tires of size 235/50R18 (rim size was 18×7.5J) for passenger cars were made and tested for the steering stability and pass-by noise by the use of a 3500 cc passenger car provided on all the four wheels with the same kind of test tires. The tire inflation pressure was 200 kPa.

The test tires had same structures except for the specifications shown in Table 1. The specifications common to all the test tires are as follows.

Tread width TW: 177 mm
  width W1 of crown main groove: 10.1 mm
  width W2 of shoulder main groove: 9.7 mm
  Distance We of crown main groove; 8.3% TW
  Distance Ws of shoulder main groove: 32.0% TW
  Depth D1 of crown main groove; 8.3 mm
  Depth D2 of shoulder main groove; 8.3 mm
  width W6 of middle rib; 31.8 mm
  width W3 of middle sub groove; 1.9 mm
  Distance W9 of middle sub groove; 33.0% W6
  Depth D3 of middle sub groove; 5.6 mm
  width W11 of inner-middle-lug-groove's sipe-like narrow part; 0.6 mm
  width W13 of outer-middle-lug-groove's sipe-like narrow part; 0.8 mm
  width W14 of middle sipe: 0.6 mm
  width W16 of shoulder rib; 40.6 mm
  width W4 of shoulder sub groove; 1.9 mm
  Distance W15 of shoulder sub groove; 22.9% W16
  Depth D4 of shoulder sub groove; 5.1 mm
  width W19 of shoulder sipe; 0.6 mm
  width W20 of crown rib; 19.4 mm
  width W5 of crown sub groove; 0.72 mm
  Distance W21 of crown sub groove; 11.0% W20
  Depth D5 of crown sub groove; 1.0 mm
  Pitch number of inner and outer middle lug grooves; 140

Steering stability test: The test car was run on a dry asphalt road and a wet asphalt road in a tire test course, and the test driver evaluated the steering stability based on the handle response, rigidity, grip and the like.

The results are indicated by an index based on Ref.1 tire being 100, wherein the larger the index number, the better the steering stability.

Pass-by noise test: According to the "Test Procedure for Tire Noise" specified in Japanese JASO-C606, the test car provided with test tires was coasted for 50 meter distance at a speed of 60 km/h in a straight test course, and the maximum noise sound level in dB(A) was measured with a microphone set at 1.2 meter height from the road surface and 7.5 meter sideways from the running center line in the midpoint of the course. The results are indicated in Table 1 by an index based on Ref.1 tire being 100, wherein the larger the index number, the better the pass-by noise.

From the test results, it was confirmed that the steering stability and pass-by noise can be effectively improved.

TABLE 1

| Tire | Ref. 1 | Ref. 2 | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| pattern (FIG.) | 5 | 1 | 1 | 1 | 1 | 1 | 1 | 1 | 1 | 1 |
| width W10 (mm) | 0.6 | 1.0 | 2.0 | 2.3 | 2.8 | 2.0 | 2.0 | 2.0 | 2.0 | 2.0 |
| width W12 (mm) | 0.8 | 1.5 | 2.5 | 3.0 | 3.5 | 2.5 | 2.5 | 2.5 | 2.5 | 2.5 |
| angle α1 (deg.) | 20 | 20 | 20 | 20 | 20 | 30 | 35 | 40 | 30 | 40 |
| angle α2 (deg.) | 30 | 30 | 30 | 30 | 30 | 40 | 45 | 55 | 57 | 57 |
| L3/W7 (%) | 10 | 10 | 10 | 10 | 10 | 10 | 10 | 10 | 10 | 10 |
| L6/W8 (%) | 15 | 15 | 15 | 15 | 15 | 15 | 15 | 15 | 15 | 15 |
| Steering stability | | | | | | | | | | |

TABLE 1-continued

| | | | | | | | | | |
|---|---|---|---|---|---|---|---|---|---|
| dry | 100 | 102 | 101 | 101 | 100 | 102 | 102 | 101 | 102 | 102 |
| wet | 100 | 99 | 102 | 103 | 104 | 103 | 104 | 104 | 103 | 105 |
| Pass-by noise | 100 | 105 | 105 | 104 | 104 | 104 | 103 | 103 | 104 | 103 |

| Tire | Ex. 9 | Ex. 10 | Ex. 11 | Ex. 12 | Ex. 13 | Ex. 14 | Ex. 15 |
|---|---|---|---|---|---|---|---|
| pattern (FIG.) | 1 | 1 | 1 | 1 | 1 | 1 | 1 |
| width W10 (mm) | 2.0 | 2.0 | 2.0 | 2.0 | 2.0 | 2.0 | 2.0 |
| width W12 (mm) | 2.5 | 2.5 | 2.5 | 2.5 | 2.5 | 2.5 | 2.5 |
| angle α1 (deg.) | 40 | 40 | 35 | 35 | 35 | 35 | 35 |
| angle α2 (deg.) | 47 | 42 | 50 | 50 | 50 | 50 | 50 |
| L3/W7 (%) | 10 | 10 | 10 | 15 | 25 | 35 | 50 |
| L6/W8 (%) | 15 | 15 | 15 | 20 | 30 | 40 | 50 |
| Steering stability | | | | | | | |
| dry | 101 | 101 | 103 | 104 | 105 | 106 | 104 |
| wet | 105 | 106 | 105 | 104 | 104 | 103 | 102 |
| Pass-by noise | 103 | 102 | 104 | 105 | 106 | 106 | 107 |

Reference Signs List
1 pneumatic tire
2 tread portion
3 crown main groove
4 shoulder main groove
5 middle sub groove
6 shoulder sub groove
7 crown sub groove
8 crown rib
9 middle rib
9i middle rib's inner edge
10 middle-rib's axially inner part
11 middle-rib's axially outer part
12 shoulder rib
13 shoulder-rib's axially inside portion
14 shoulder-rib's axially outside portion
15 axially inner middle lug groove
15a axially-inner-middle-lug-groove's main part
15b axially-inner-middle-lug-groove's sipe-like narrow part
16 axially outer middle lug groove
16a axially-outer-middle-lug-groove's main part
16b axially-outer-middle-lug-groove's sipe-like narrow part
17 middle sipe
18, 18a, 18b shoulder sipe
19 shoulder lug groove
C tire equator
Te tread edge

The invention claimed is:

1. A pneumatic tire comprising a tread portion provided with a pair of circumferentially-continuously-extending crown main grooves disposed on both sides of the tire equator, and a pair of circumferentially-continuously-extending shoulder main grooves disposed on the axially outside of said crown main groove, so that the tread portion is divided into ribs including a crown rib between the pair of crown main grooves, a pair of middle ribs between the crown main grooves and shoulder main grooves, and a pair of shoulder ribs between the shoulder main grooves and tread edges, wherein the middle rib is provided with a circumferentially-continuously-extending middle sub groove having a width of from 1.5 to 3.0 mm and having a groove center line positioned between 20% and 45% of the width of the middle rib from the axially inner edge of the middle rib, so as to define an inner middle part and an outer middle part, the inner middle part is provided with inner middle lug grooves which are arranged circumferentially of the tire at intervals and which extend from the middle sub groove toward the tire equator side and terminate without reaching to the crown main groove, said inner middle lug groove comprises an inner lug's main part having a groove width of not less than 1.5 mm and formed on the middle sub groove side, and an inner sipe-like part having a groove width of less than 1.5 mm and formed on the tire equator side of the inner lug's main part, the outer middle part is provided with outer middle lug grooves which are arranged circumferentially of the tire at intervals and which extend from the shoulder main groove towards the tire equator side and terminate without being connected to the middle sub groove, said outer middle lug groove comprises an outer lug's main part having a groove width of not less than 2.0 mm and formed on the shoulder main groove side, and an outer sipe-like part having a groove width of less than 2.0 mm and formed on the tire equator side of the outer lug's main part.

2. The pneumatic tire as set forth in claim 1, wherein said outer middle part is provided between the circumferentially adjacent outer middle lug grooves with a middle sipe extending from the shoulder main groove to the middle sub groove, and said middle sipe has an axially inner end which is oppositely opposed to inner middle lug grooves with the middle sub groove interposed therebetween.

3. The pneumatic tire as set forth in claim 2, wherein with respect to the tire circumferential direction, said outer middle lug groove is inclined at an angle αof from 25 to 57 degrees so that the angle α2 measured at the end of the tire equator side of the outer middle lug groove is more than the angle α1 measured at the end of the shoulder main groove side of the middle lug groove.

4. The pneumatic tire as set forth in claim 2, wherein the axial distance of the axially inner end of the inner sipe-like part from the crown main groove is in a range of from 15 to 40% of the width of the inner middle part, and the axial distance of the axially inner end of the outer sipe-like part from the middle sub groove is in a range of from 15 to 40% of the width of the outer middle part.

5. The pneumatic tire as set forth in claim 2, wherein the shoulder rib is provided with a single shoulder sub groove having a groove width of from 1.5 to 3.5 mm, and extending continuously in the tire circumferential direction to have a groove center line at a distance in a range of from 18 to 34% of the axial width of the shoulder rib from the axially inner edge of the shoulder rib, thereby defining an inside shoulder portion between the shoulder sub groove and the shoulder main groove, and an outside shoulder portion outside the shoulder sub groove, and the inside shoulder portion is provided with no one of a groove, sipe and incision.

6. The pneumatic tire as set forth in claim 2, wherein the crown rib is provided with a pair of crown sub grooves having a groove width of from 0.7 to 1.7 mm, and each extending continuously in the tire circumferential direction to have a groove center line at a distance in a range of from 10% to 20% of the axial width of the crown rib from an axial edge disposed on both sides of the respective crown rib towards the tire equator sides.

7. The pneumatic tire as set forth in claim 1, wherein with respect to the tire circumferential direction, said outer middle lug groove is inclined at an angle α of from 25 to 57 degrees so that the angle α2 measured at the end of the tire equator side of the outer middle lug groove is more than the angle α1 measured at the end of the shoulder main groove side of the middle lug groove.

8. The pneumatic tire as set forth in claim 3, wherein the axial distance of the axially inner end of the inner sipe-like part from the crown main groove is in a range of from 15 to 40% of the width of the inner middle part, and the axial distance of the axially inner end of the outer sipe-like part from the middle sub groove is in a range of from 15 to 40% of the width of the outer middle part.

9. The pneumatic tire as set forth in claim 7, wherein the shoulder rib is provided with a single shoulder sub groove having a groove width of from 1.5 to 3.5 mm, and extending continuously in the tire circumferential direction to have a groove center line at a distance in a range of from 18 to 34% of the axial width of the shoulder rib from the axially inner edge of the shoulder rib, thereby defining an inside shoulder portion between the shoulder sub groove and the shoulder main groove, and an outside shoulder portion outside the shoulder sub groove, and the inside shoulder portion is provided with no one of a groove, sipe and incision.

10. The pneumatic tire as set forth in claim 7, wherein the crown rib is provided with a pair of crown sub grooves having a groove width of from 0.7 to 1.7 mm, and each extending continuously in the tire circumferential direction to have a groove center line at a distance in a range of from 10% to 20% of the axial width of the crown rib from an axial edge disposed on both sides of the respective crown rib towards the tire equator sides.

11. The pneumatic tire as set forth in claim 1, wherein the axial distance of the axially inner end of the inner sipe-like part from the crown main groove is in a range of from 15 to 40% of the width of the inner middle part, and the axial distance of the axially inner end of the outer sipe-like part from the middle sub groove is in a range of from 15 to 40% of the width of the outer middle part.

12. The pneumatic tire as set forth in claim 11, wherein the shoulder rib is provided with a single shoulder sub groove having a groove width of from 1.5 to 3.5 mm, and extending continuously in the tire circumferential direction to have a groove center line at a distance in a range of from 18 to 34% of the axial width of the shoulder rib from the axially inner edge of the shoulder rib, thereby defining an inside shoulder portion between the shoulder sub groove and the shoulder main groove, and an outside shoulder portion outside the shoulder sub groove, and the inside shoulder portion is provided with no one of a groove, sipe and incision.

13. The pneumatic tire as set forth in claim 11, wherein the crown rib is provided with a pair of crown sub grooves having a groove width of from 0.7 to 1.7 mm, and each extending continuously in the tire circumferential direction to have a groove center line at a distance in a range of from 10% to 20% of the axial width of the crown rib from an axial edge disposed on both sides of the respective crown rib towards the tire equator sides.

14. The pneumatic tire as set forth in claim 1, wherein the shoulder rib is provided with a single shoulder sub groove having a groove width of from 1.5 to 3.5 mm, and extending continuously in the tire circumferential direction to have a groove center line at a distance in a range of from 18 to 34% of the axial width of the shoulder rib from the axially inner edge of the shoulder rib, thereby defining an inside shoulder portion between the shoulder sub groove and the shoulder main groove, and an outside shoulder portion outside the shoulder sub groove, and the inside shoulder portion is provided with no one of a groove, sipe and incision.

15. The pneumatic tire as set forth in claim 14, wherein the outside shoulder portion is provided with shoulder sipes extending axially outwardly from the shoulder sub groove and arranged circumferentially of the tire at intervals.

16. The pneumatic tire as set forth in claim 15, wherein shoulder lug grooves whose axially inner ends are connected to the shoulder sipes in the vicinity of the tread edges are disposed circumferentially of the tire at intervals 2 times said intervals of the shoulder sipes.

17. The pneumatic tire as set forth in claim 16, wherein the crown rib is provided with a pair of crown sub grooves having a groove width of from 0.7 to 1.7 mm, and each extending continuously in the tire circumferential direction to have a groove center line at a distance in a range of from 10% to 20% of the axial width of the crown rib from an axial edge disposed on both sides of the respective crown rib towards the tire equator sides.

18. The pneumatic tire as set forth in claim 15, wherein the crown rib is provided with a pair of crown sub grooves having a groove width of from 0.7 to 1.7 mm, and each extending continuously in the tire circumferential direction to have a groove center line at a distance in a range of from 10% to 20% of the axial width of the crown rib from an axial edge disposed on both sides of the respective crown rib towards the tire equator sides.

19. The pneumatic tire as set forth in claim 14, wherein the crown rib is provided with a pair of crown sub grooves having a groove width of from 0.7 to 1.7 mm, and each extending continuously in the tire circumferential direction to have a groove center line at a distance in a range of from 10% to 20% of the axial width of the crown rib from an axial edge disposed on both sides of the respective crown rib towards the tire equator sides.

20. The pneumatic tire as set forth in claim 1, wherein the crown rib is provided with a pair of crown sub grooves having a groove width of from 0.7 to 1.7 mm, and each extending continuously in the tire circumferential direction to have a groove center line at a distance in a range of from 10% to 20% of the axial width of the crown rib from an axial edge disposed on both sides of the respective crown rib towards the tire equator sides.

\* \* \* \* \*